United States Patent [19]

Allen et al.

[11] Patent Number: 5,430,480
[45] Date of Patent: Jul. 4, 1995

[54] SENSOR DRIVEN GLOBAL MOTION COMPENSATION

[75] Inventors: James Allen, Castro Valley; Martin Boliek, Palo Alto; Steven Blonstein, San Jose; Michael Gormish, Stanford, all of Calif.

[73] Assignee: Ricoh California Research Center, Menlo Park, Calif.

[21] Appl. No.: 207,244

[22] Filed: Mar. 7, 1994

Related U.S. Application Data

[63] Continuation of Ser. No. 906,623, Jun. 30, 1992, abandoned.

[51] Int. Cl.[6] .............................................. H04N 5/228
[52] U.S. Cl. .............................................. 348/208
[58] Field of Search ............... 348/208, 207, 699, 700; H04N 5/228

[56] References Cited

U.S. PATENT DOCUMENTS

| | | | |
|---|---|---|---|
| 4,837,632 | 6/1989 | Kubo et al. | 348/208 |
| 5,020,890 | 6/1991 | Oshima et al. | 358/222 |
| 5,065,246 | 11/1991 | Takemoto et al. | 358/227 |
| 5,103,306 | 4/1992 | Weiman | 358/133 |

FOREIGN PATENT DOCUMENTS 2116397 9/1983 United Kingdom .......... H04N 5/14

*Primary Examiner*—Joseph Mancuso
*Assistant Examiner*—Tuan V. Ho
*Attorney, Agent, or Firm*—Townsend and Townsend Khourie and Crew; Philip H. Albert

[57] ABSTRACT

A motion sensor is mounted within a camera, and measures motion data such as translation, rotation, and zoom. The motion data is then associated with the video frame data captured by the camera. In some embodiments, the motion data is used to remove jitter in the frame data due to camera movement, and in some embodiments, the motion data is used to remove global motion from frame data before compression. Since the motion data is kept with the video frame data, the motion data is available during decompression of the video frames.

6 Claims, 6 Drawing Sheets

SENSOR DRIVEN GLOBAL MOTION COMPENSATION

CROSS-REFERENCE TO RELATED APPLICATIONS

This application is an FWC continuation application of Ser. No. 07/906,623, filed Jun. 30, 1992, now abandoned.

BACKGROUND OF THE INVENTION

The present invention relates to the field of global motion compensation in video imagery. More specifically, in one embodiment the invention provides a method and apparatus for compensating for global motion in a video scene.

Recording a scene with a video camera is known in the art. The camera records many individual images, or frames, taken at regular intervals. Motion in the recorded scene translates to differences in the still images of successive frames, and if the intervals are small enough, displaying the succession of frames will recreate the motion of the recorded scene. The motion in the scene, or the difference between successive frames, is due to either real motion of a physical object in the scene being recorded, or apparent motion caused by camera movement or zoom adjustment. Because apparent motion is caused by camera movements, it generally results in global motion, where the entire scene shifts, as opposed to local motion due to a small part of the scene moving against a steady background.

Often, the amount and direction of the apparent movement is of interest. For example, since apparent motion is caused by camera movements, the unwanted jittering in a recording due to camera movements can be eliminated if the apparent motion is known, since an equal and opposite apparent motion can be added to eliminate the jitter.

Another use for apparent motion information is in image compression, since the amount of data needed to represent a slowly moving or steadily recorded scene is less than the amount needed for a fast moving scene. For example, a static scene of many frames can be compressed by merely eliminating all but one frame. The recording can be decompressed by copying the one remaining frame to reconstruct all the eliminated frames since they are all identical. In a moving scene, where the recording comprises frames which are different from one another, compression is more difficult, however not impossible.

Compression of data depends on the complexity of the data. If the data contains duplicate information, the duplicate data can be replaced with a much smaller data indicating where the duplicated data is to be found. Similarly, if the data, such as image data, contains simple patterns which can be described in less data than the image itself, the data can be compressed. Thus, compression is greater for simpler images. With motion picture image data, high compression is possible by replacing all by an initial full image with difference frames. A difference frame is a image comprising the differences between successive frames. Since the initial frame is not replaced, all the other frames can be recreated by successively adding the difference frames to the initial frame. Of course, if nothing in the view of a camera capturing the motion picture is moving, there are no interframe differences, and the difference frames are all zero. Maximum compression is available with zero differences, since only the initial frame and data indicating the lack of motion need be stored.

While it is rarely possible to record only static scenes, some scenes can be rendered fairly static by removing the global motion from frame to frame before taking difference frames. Thus, to improve the compressibility of a recording, global motion is removed from the data by eliminating the global motion and storing the parameters of the global motion such as direction and speed for use during decompression, thereby simplifying the difference frames.

For these reasons, knowledge of camera movement is desirable. One known method for determining camera movement is to digitally process recorded frames and determine the camera movement based on the global motion detected between recorded frames. This requires substantial computing power and will result in inaccurate estimations of camera movement where a large, moving object dominates the scene. Although global motion calculations relative to a moving object might be advantageous for compression, typically, global motion is calculated relative to a stationary background.

Furthermore, the amount of computing power available in a camera is limited by space, electrical power, and the need for real-time processing. Consequently, any means to simplify the determination of camera movement would be an needed improvement.

Many cameras offer global motion compensation, in the form of image stabilization. Typically stabilization of the image is accomplished through gyroscopes which prevent the camera from rotating, or motion sensor-mirror combinations where the camera is free to move, but a movable mirror is placed between the recording sensor, usually a charge coupled device (CCD) and the lens of the camera. The mirror is moved in the "opposite" direction as that detected by the motion detector to cancel out global motion.

Such systems require a means for distinguishing undesirable high-frequency motion, such as the hand vibrations of a person holding the camera or an automobile to which the camera is mounted, from desirable low-frequency motion such as panning. Also, with such compensation systems, the correction must be either imposed at the time of image capture, or it is lost. If the motion signals are used, they are used to move a mirror placed before a recording sensor such as a CCD, thus the image recorded is one where the motion has been restrained by the action of the compensating mirror.

If the motion signals are not used, the motion information is discarded and is not available for later processing. Thus, sensor-mirror systems can only be used to stabilize a scene. While stabilization is convenient for a typical video hobbyist, stabilization does not address the problem of video compression when low frequency motion is present in a scene. Furthermore, the automatic correction of a gyroscopic stabilizer or sensor-mirror system reduces the amount of control a user has over the recording, and even where the camera allows a choice between accurate recording and stabilized recording, as the recording is made, the choice is permanent. Thus, an apparatus is needed to allow for both a stable, but processed, playback and a jittery, but accurate, playback.

In a camera with a sensor-mirror system, the resulting recording is not, by itself, optimized for compression as a digitally-compensating camera would produce. In a sensor-mirror or gyroscope camera, low frequency apparent motion must be ignored, to allow the user to pan the camera. Because this motion is ignored, it appears in the recorded frames, and the only way to remove the apparent motion before compression is to compute the low frequency global motion from the frame data.

Because the sensor-mirror and gyroscopic compensation methods alter what is recorded, these methods cannot be used to compensate for camera zoom, since to do so would totally cancel the effect of the zoom.

From the above it is seen that an improved method for global motion compensation in recorded scenes is needed.

SUMMARY OF THE INVENTION

Improved global motion compensation is provided by virtue of the present invention.

In one embodiment of the present invention, a motion sensor is provided in a camera to record the movement of the camera. The motion sensor measures the camera's movement in space as well as the zoom factor of the lens for recording along with the frames comprising still images of the scene. In this way, the apparent motion from frame to frame which is due to a camera pan or zoom can be determined without extensive computation. In one embodiment, the sensor data includes motion data for camera rotation in two dimensions and zoom values, while other embodiments include camera translation in three directions, camera rotation about three axes, and zoom values.

The recorded motion data can be used to stabilize the recorded scene, and can also be used to predict the frame-to-frame global motion as a precursor to video compression.

A further understanding of the nature and advantages of the inventions herein may be realized by reference to the remaining portions of the specification and the attached drawings.

DESCRIPTION OF THE PREFERRED EMBODIMENTS

Figure 1:
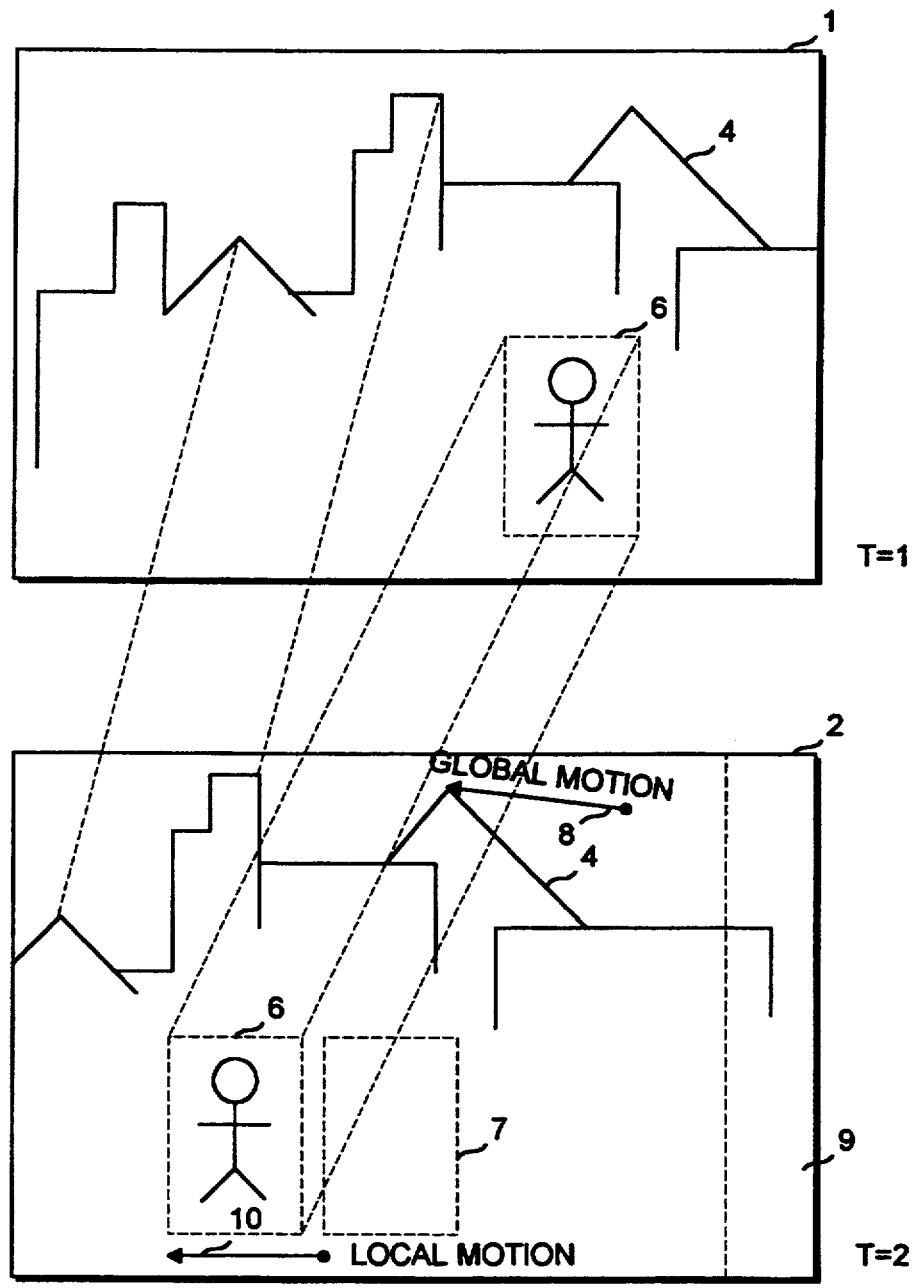
FIG. 1 is a simplified diagram showing global motion and local motion between two recorded frames.

The concepts of global motion and local motion are illustrated in FIG. 1. Motion is expressed with respect to two frames. Frame 1 and frame 2 and contain global motion as well as local motion. The change in the position of a background terrain 4 is global motion and the change in position of a foreground figure in area 6, and the vacating of area 7 is local motion. Except where the entire background moves, global motion is due to camera movements and local motion is due to actual movement in the physical scene. As FIG. 1 illustrates, most of the differences between pixels in frame 1 and corresponding pixels in frame 2 are due to global motion rather than local motion. Therefore, just by removing the global motion very little difference between frames 1 and 2 remains.

Strictly speaking, frames 1 and 2 are not always "snapshots" of the physical scene at well-defined points in time separated by a frame period, however they can be treated as such. A finite amount of time is needed to record a full frame, and usually frames are recorded continuously during a frame period, starting with the top left pixel and ending with the bottom right pixel, with one frame starting right after the end of another. Since the pixels are scanned in the same pattern each time, the time delay between the capture of a pixel in frame 1 and the capture of the corresponding pixel in frame 2 is constant and equal to the frame period. Because of this constant delay, and because a pixel in frame 1 is not often compared to pixels which are not close neighbors of the corresponding pixel in frame 2, the pixels of a frame can be considered a pixel representation of a physical scene at a single point in time. An object in the physical scene which is moving fast relative to the frame period might be distorted by this assumption, but such distortions exist in the frame data regardless of any processing performed on that data. Once each frame is assumed to be a snapshot of a physical scene at a given point in time, interframe motion can be defined as the difference between the pixels of successive frames.

Because of the distortion caused by the time lapse over which a single image is captured, some applications, such as scientific data collection, require a camera which records an entire scene at a single point in time. The present invention works as well with such a camera.

Global motion between two frames is represented by a single vector, global motion vector 8. While FIG. 1 shows only one local motion vector 10, if other objects in other areas of the frame were to move, they would have other independent local vectors. Global motion vector 8 fully describes how to translate the background of frame 1 to frame 2, thus only frame 1, area 6, an area 7 exposed by the movement of area 6, an area 9 brought into view by the movement of the frame boundary, and global motion vector 8 need be included in a compressed representation of frame 1 and frame 2. Upon decompression, frame 1 forms the basis for the reconstruction of frame 2, where each element of frame 1 is moved in frame 2 by the distance and direction indicated by the global motion vector and the images in areas 6, 7 and 9 are recreated. A similar global motion vector can be determined for zooms, however only a scalar quantity is needed for zooms, since the global motion of a zoomed frame can be reconstructed from the original frame by moving each point in the original frame toward or away from the center of the frame by a percentage indicated by the scalar quantity.

Figure 2:
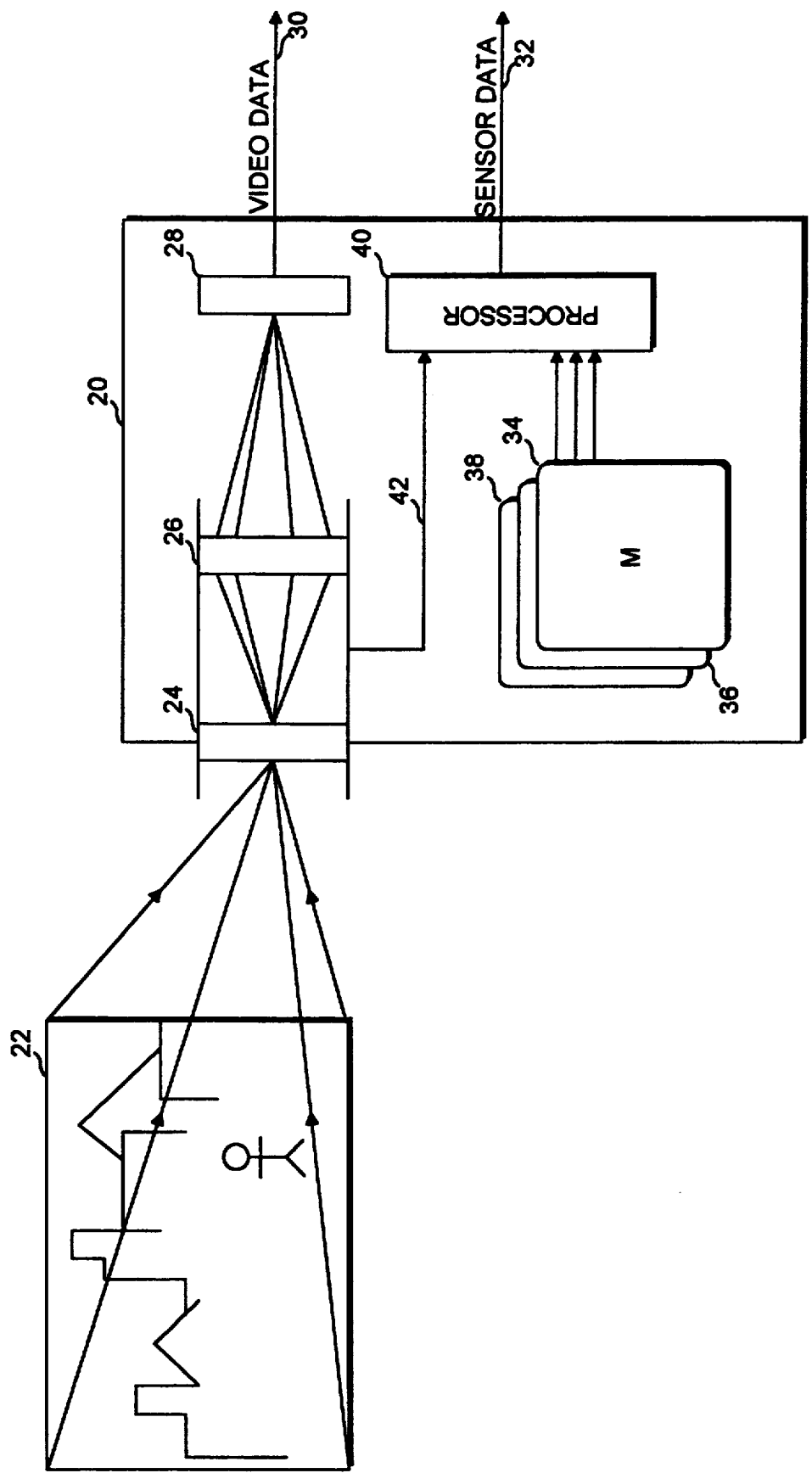
FIG. 2 illustrates one embodiment of a camera according to the present invention.

FIG. 2 is a block diagram illustrating one embodiment of a video camera according to the present invention. As with a prior art video camera, a camera 20 records a physical scene 22, using a fixed lens 24 and a zoom lens 26 to focus light onto a charge coupled device 28, to produce a continuous stream of frames on video data bus 30. However, an additional data stream, on sensor data bus 32, is also provided. Motion detectors 34, 36, and 38 indicate to a processor 40 the movement of camera 20 in each of the three axial directions.

The motion detectors could be three orthogonal angular rate sensors, for instance. Zoom information is also provided to processor 40 via zoom monitor line 42. This line 42 could simply be the control signal sent to the zoom motor. In some embodiments, less than three sensors are used, and in other embodiments, more than three sensors are used.

Processor 40 does not need to perform complex computations, but instead merely records, and in some embodiments digitizes, the sensor and zoom data and provides it as a data stream on sensor data bus 32. In some embodiments, video data on video data bus 30 is also digitized, and video data and its associated motion data are synchronized.

Figure 3A:
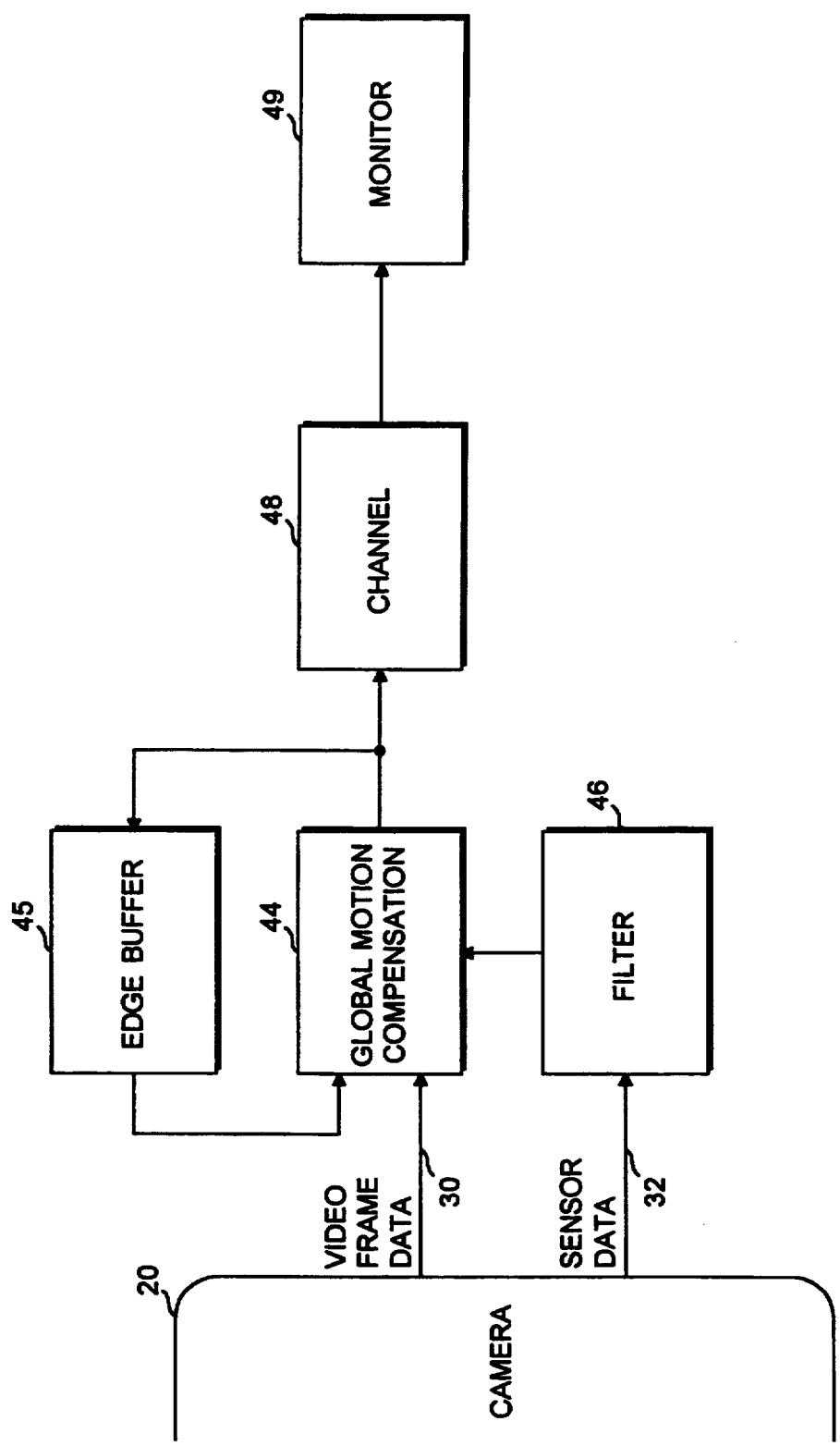
FIG. 3a is a block diagram of a system for jitter compensation according to the present invention.

FIG. 3a is a block diagram of a jitter compensation system using the video and sensor data provided by camera 20. As shown in FIG. 3a, video data bus 30 is coupled as an input to a motion compensator 44, and sensor data bus 32 is coupled as an input to filter 46, which is also coupled as an input to motion compensator 44. Filter 46 could be analog or digital depending on the format of the sensor data. Motion compensator 44 is coupled as an input to a channel 48, and the output of channel 48 is coupled as an input to monitor 49. An edge buffer 45 is coupled to the output and an input of motion compensator 44.

Motion compensator 44 operates according to conventional motion compensation techniques, such as those discussed in Tse, Yi Tong, and Richard L. Baker, "Camera Zoom/Pan Estimation and Compensation for Video Compression", 1991 *Data Compression Conference*, Snowbird, Utah, 1991, which is incorporated herein by reference. Filter 46 is a conventional digital filter, such as those discussed in Netrivali, Arun N., and Barry G. Haskell, *Digital Pictures Representation and Compression*, Plenum Press (1989), pp. 334–344, which is incorporated herein by reference.

In some embodiments, channel 48 is a bandwidth limited communication channel such as a satellite link or a telephone line, but in other embodiments, channel 48 is a finite capacity storage medium, such as a digital memory, a magnetic tape, or a disk. The present invention is applicable to any system containing a channel which limits the size of the data from the camera in the manner that storage devices and communications links limit data volume. The present invention is also applicable where global motion detection is required.

Monitor 49 is not necessary to the present invention, but is shown to represent a typical use of the video data from camera 20. In other embodiments, monitor 49 is replaced with a video processing computer or a broadcast transmitter.

In operation, camera 20 provides video data and sensor data on busses 30 and 32, respectively. The sensor data is high pass filtered so that only high frequency camera movement data is passed to motion compensator 44. The motion compensator then adjusts the frames of the video data to cancel out those high frequency movements of the camera, leaving only the low frequency movements of the camera, which are usually intentional panning movements. Zoom is not compensated for.

Edge buffer 45 is provided to store edge data from a prior frame to fill scenes as necessary. Generally speaking, motion compensator 44 operates to remove frame-to-frame jitter by moving a frame into alignment with the preceding frame to correct for camera movement. However, in moving the frame, an edge is exposed. The edge would have been part of the recorded scene, if camera 20 had not moved during recording. While it is possible to have camera 20 record a scene wider than an actual frame to avoid exposed edges, edge buffer 45 provides a simpler method of covering edges. Edge buffer 45 stores pixels along the edge of a scene for one frame period. Then, as a frame is moved by motion compensator 44, the exposed edges are filled with corresponding pixels from the preceding frame. In some embodiments, edge buffer 45 is part of motion compensator 44, and in some embodiments, for further simplicity, edge buffer 45 is a full frame buffer which stores the entire preceding frame.

The compensated video data output of motion compensator 44 is either stored or transmitted as appropriate for the type of channel 48 used, and is viewed on monitor 49. The video viewed on monitor 49 will appear smoother than the raw video recorded by camera 20, and all without extensive computation.

Figure 3B:
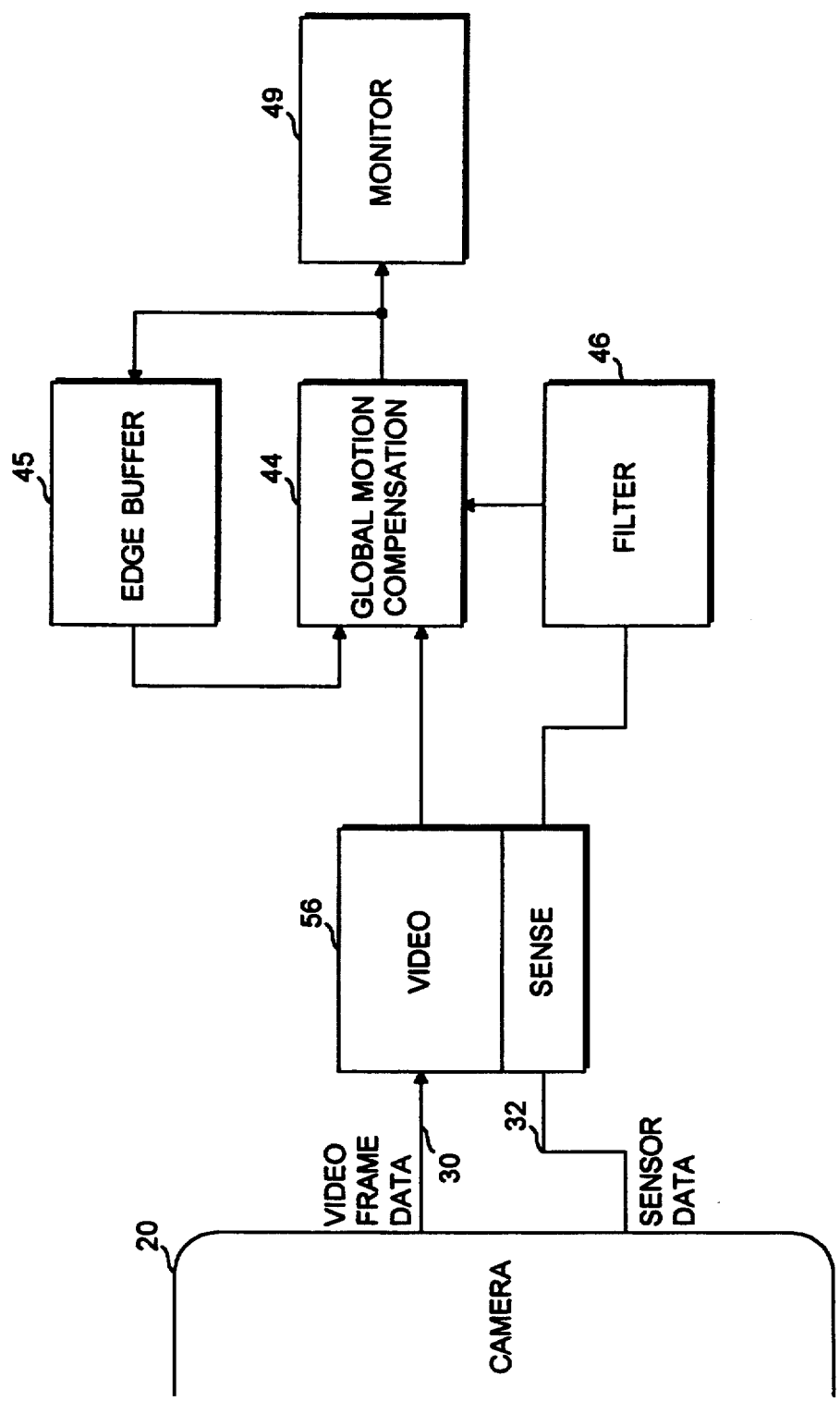
FIG. 3b is a block diagram of an alternate arrangement of a system for jitter compensation according to the present invention.

FIG. 3b is a block diagram of an alternate arrangement of a system for jitter compensation according to the present invention. The system of FIG. 3b is similar to the system of FIG. 3a, except that the global motion compensation is performed after the channel. Here, a channel 56 having a video subchannel and a sensor data subchannel is used.

Figure 4:
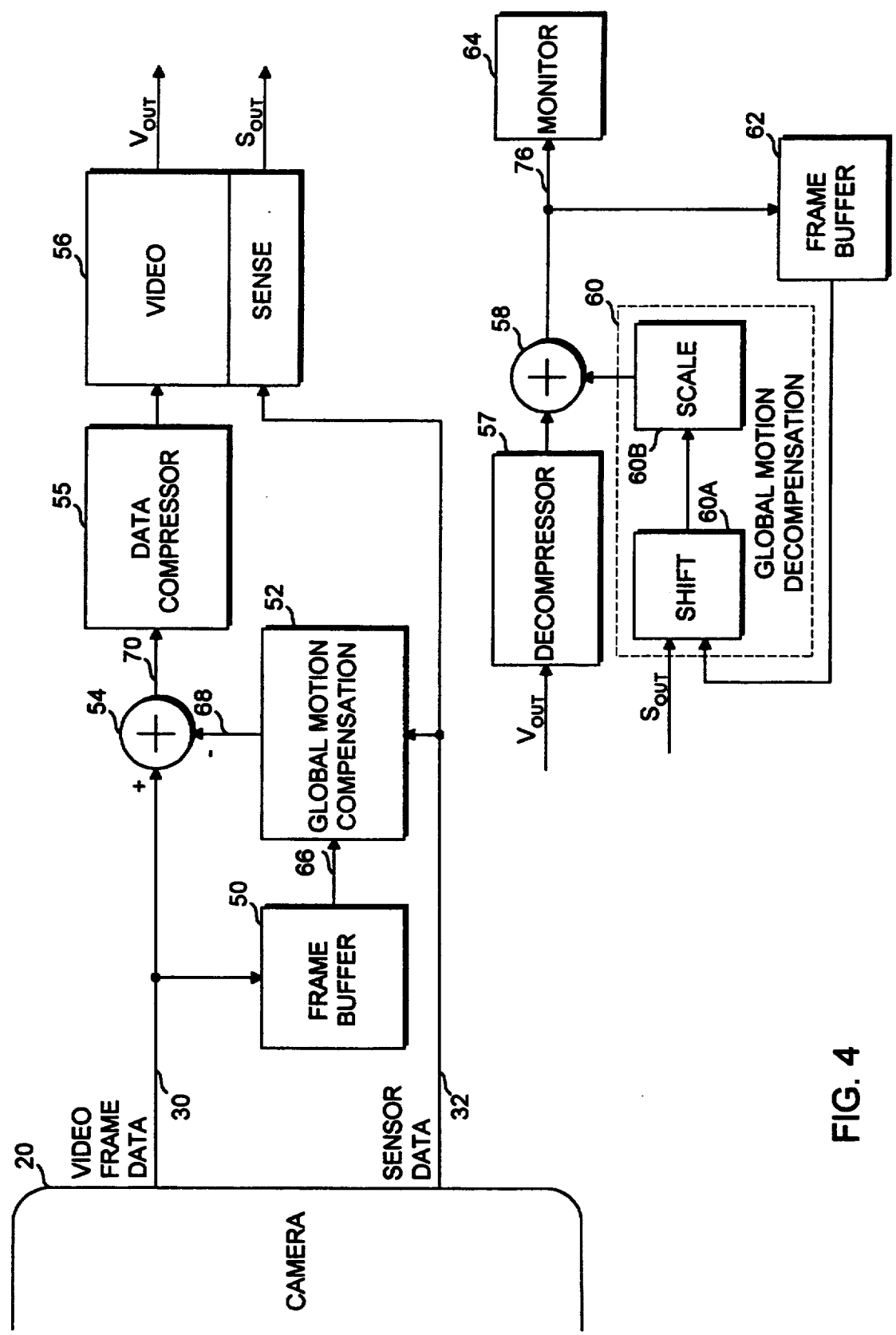
FIG. 4 is a block diagram of a system for data compression according to the present invention.

FIG. 4 is a block diagram of a system for data compression according to the present invention. The system includes a video frame buffer 50, a motion compensator 52, an adder 54, a data compressor 55, channel 56, a data decompressor 57, an adder 58, a motion decompensator 60, a video frame buffer 62, and a monitor 64. Motion decompensator 60 includes a frame shifter 60a and a frame scaler 60b. As in FIG. 3, in some embodiments, channel 56 is a band-width limited communication channel such as a satellite link or a telephone line, but in other embodiments, channel 56 is a storage medium, such as a digital memory, a magnetic tape, or a disk, with an additional capacity to carry or store sensor data.

In operation, camera 20 provides video data and sensor data on busses 30 and 32, respectively. Video frame buffer 50 is used to delay the video data by one frame so that adder 54 can operate on two successive frames to determine the frame differences due to local motion. Motion compensator 52 removes camera motion from the frame provided on a bus 66 by video frame buffer 50. The provided frame on bus 66 is the frame just before the current frame on bus 30. Motion compensator 52 is provided the necessary camera movement data on sensor data bus 32 by camera 20, and provides an adjusted frame with the camera movement removed, on bus 68.

When the adjusted frame on bus 68 is subtracted from the current frame on video data bus 30, what remains is only a difference frame comprising the local motion differences between the current frame and the previous frame. The difference frame is usually a less complex image than the video frames, so it can be represented by many fewer bits than a full frame image. The difference frame, on bus 70, is then compressed by data compressor 55, and the compressed frame is then applied to the video input of channel 56. Again, in some embodiments, channel 56 is a bandwidth limited communications channel and in other embodiments channel 56 is a finite capacity storage medium.

The video output of channel 56 is coupled to the input of data decompressor 57, which decompresses the received difference frames and outputs them to one input of adder 58. The sense data from channel 56 is provided to one input of motion decompensator 60. The other input of motion decompensator 60 is coupled to the output of frame buffer 62. Frame buffer 62 contains the pixels of the frame previous to the frame being decompressed. In this way, motion decompensator 60 creates a decompensated reference frame from the prior frame and the sensor data. The decompensated reference frame is output to adder 58, where it is combined with the difference frame from decompressor 57 to reconstructed the original frame from bus 30. The reconstructed frame is then sent along bus 76, where it is displayed on monitor 64, or otherwise processed, and a copy of the reconstructed frame is input to frame buffer 62. Thus, the opposite operations from the input side of channel 56 are performed, and the reconstructed frames on bus 76 correspond to the original frames on video data bus 30.

The output at monitor 64 is the output of the camera on video data bus 30, except that it is possibly delayed by channel 56. Any camera motion, desirable or undesirable, remains in the display of monitor 64, however the amount of data flowing, and hence the bandwidth required, in channel 56 is greatly reduced.

Figure 5:
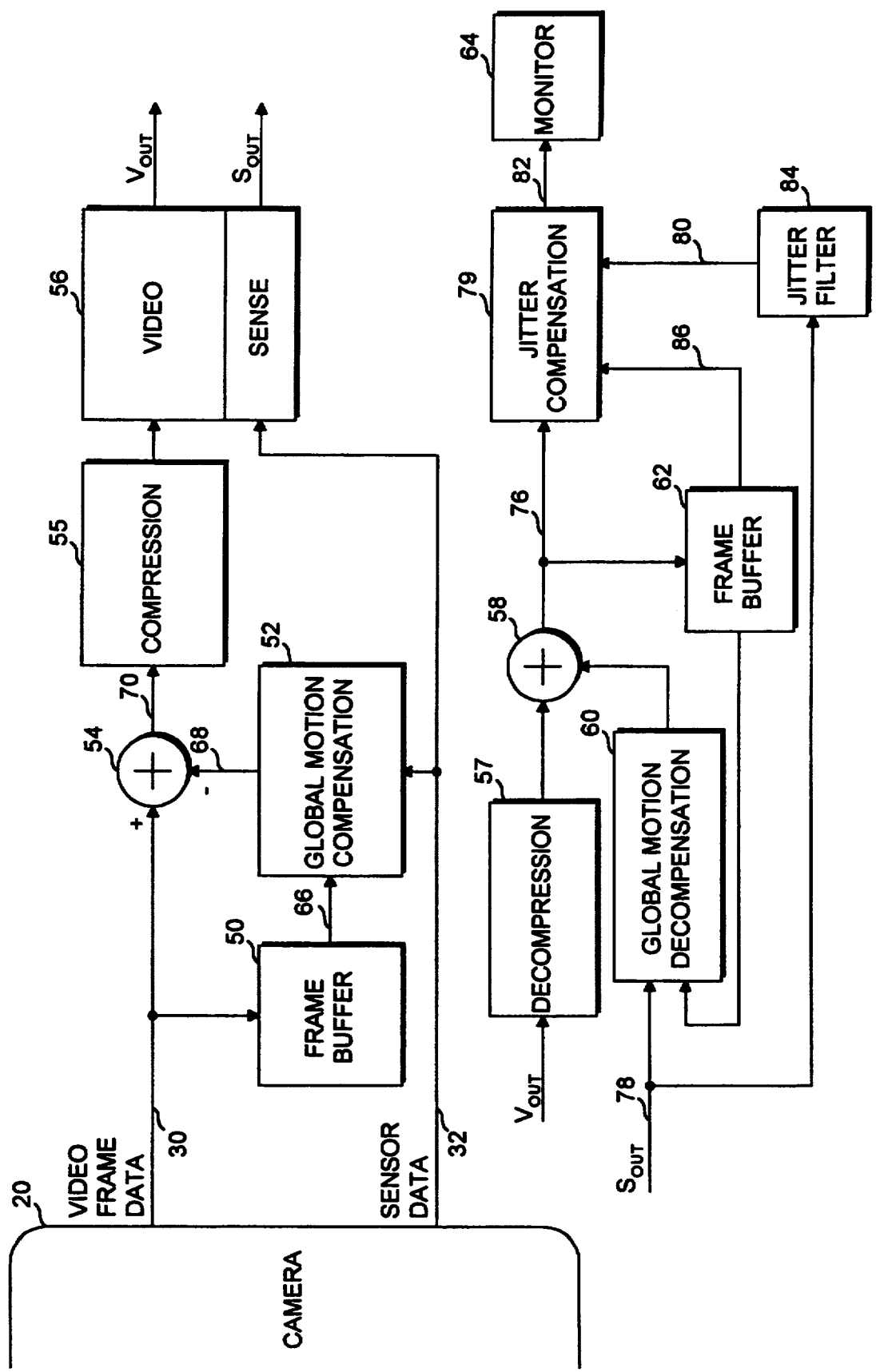
FIG. 5 is a block diagram of a system for jitter compensation and data compression according to the present invention.

FIG. 5 is a block diagram of a system for jitter compensation and data compression according to the present invention. This system is a combination of the systems shown in FIG. 3b and FIG. 4. Up to bus 76, the system works as shown in FIG. 4. After the video frames are reconstructed by adding back camera motion and local motion difference data, the reconstructed frames are moved by a jitter compensator 79 to remove high frequency, or other unwanted, movements. Sensor data, indicating camera movements, is provided to jitter filter 84 by the sensor output of channel 56. Jitter filter 84 filters out the desirable camera movements, such as zoom and slow pans, while passing on sensor data indicating camera jitter on bus 80. This data is then used by jitter compensator 79 to cancel out such undesirable movements in the frames, thus providing stabilized video scenes on bus 82 to monitor 64, while still being able to store or transmit the video frames using minimal bandwidth, and all without complex computation. Frame buffer 62 also acts as an edge buffer, providing edge pixels from a prior frame to cover the edges exposed by jitter compensator 79, on a bus 86.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A camera comprising:

a lens for focussing light from a physical scene;

an optical image sensor for periodically capturing said focused light and for producing a series of video frames, each frame representing light captured from said physical scene;

a lens motion detection means for measuring motion of said lens with respect to said physical scene or measuring adjustments of said lens with respect to said optical image sensor, said motion occurring relative to a first video frame and a second video frame;

a video output means, coupled to an output of said optical image sensor, for providing data representing said series of frames;

a sensor output means, coupled to an output of said lens motion detection means, for providing motion data representing said motion occurring relative to said first and second video frames, said motion data referenced to said first and second video frames relative to which said lens motion occurred;

a compensation means for global motion compensation, coupled at a first input to said video output means and coupled at a second input to said sensor output means, wherein said compensation means outputs a compensated video frame, wherein one of said first and second video frames is said compensated video frame and the other is designated a reference video frame;

a comparator means, coupled at a first input to said video output means and coupled at a second input to an output from said compensation means, for comparing said compensated video frame and said reference video frame to produce a difference frame, wherein a series of video frames results in a series of difference frames;

a means for compressing data, coupled to an output from said comparator means, which compresses said series of difference frames into compressed data with a compression ratio greater than if said compensation means is not used;

means for transmitting data, coupled to said means for compressing data, said means for transmitting data comprising a video output for providing compressed video data and a sense output for providing said motion data;

means, coupled to said video output, for decompressing said compressed video data to form a decompressed frame;

reconstruction means, coupled to said sense output, for reconstructing a decompression reference frame from said motion data and a frame previous to said decompressed frame; and frame combination means, coupled to said decompressing means and said reconstruction means, for adding said decompression reference frame said to said decompressed frame to form a reconstructed frame.

2. The apparatus of claim 1, further comprising:

filter means, coupled to said sensor output means, for filtering said motion data; and means, coupled to said video output means and said filter means, for shifting and scaling data in frames of said series of frames in response to an output of said filter means.

3. The apparatus of claim 2, wherein said filter means is a high-pass filter.

4. The apparatus of claim 1, further comprising:

filter means, coupled to said sense output of said means for transmitting data; and means, coupled to said adding means and said filter means, for shifting and scaling data in frames of said series of frames in response to an output of said filter means.

5. The apparatus of claim 1, wherein said compensation means further comprises:

a frame delay means, coupled to said video output means, for delaying said series of frames by one frame;

a motion compensation means, coupled at a first input to an output from said frame delay means, and coupled at a second input to said sensor output means, for adjusting for motion in said series of frames, received from said frame delay means, by utilizing said motion data provided by said sensor output means; and an output from said motion compensation means coupled to said comparator means.

6. A camera comprising:

a lens, which focusses light from a physical scene;

an optical image sensor, which periodically captures said focused light and produces a series of video frames, each video frame representing light captured from said physical scene during a capture period associated with said each video frame;

a lens motion detector, which measures lens motion, said lens motion being one of motion of said lens with respect to said physical scene and motion due to adjustments of said lens with respect to said optical image sensor;

a video output from said optical image sensor, which outputs data representing said series of video frames;

a sensor output from said lens motion detector, which outputs motion data representing lens motion occurring between capture periods of a first video frame and second video frame, said motion data referenced to said first and second video frames;

a global motion compensator, coupled to receive data from said video output and said sensor output, which outputs a compensated video frame, wherein one of said first and second video frames is said compensated video frame and the other is designated a reference video frame;

a comparator, coupled at a first input to said video output and at a second input to said global motion compensator, which compares said compensated video frame and said reference video frame and outputs a difference frame which embodies image differences between said compensated video frame and said reference video frame, wherein a series of video frames result in a series of difference frames;

a data compressor, coupled to said comparator, which compresses said series of difference frames into compressed data with a compression ratio greater than if said global motion compensator were not used, and such that said series of video frames are reconstructible from said motion data and said compressed data;

a transmitter, coupled to said data compressor, which transmits said compressed data to a compressed video output and transmits said motion data to a sense output;

a decompressor, coupled to said video outputs, which decompresses said compressed video data to form a decompressed frame;

a frame reconstructor, coupled to said sense output, which reconstructs a decompression reference frame from said motion data and a frame previous to said decompressed frame; and a frame adder means, coupled to said decompressor and said frame reconstructor, which adds said decompression reference frame to said decompressed frame to form a reconstructed frame.

* * * * *